April 14, 1936.                C. A. MARTIN                 2,037,082
                             REGULATING SYSTEM
                           Filed Jan. 15, 1932              2 Sheets-Sheet 1
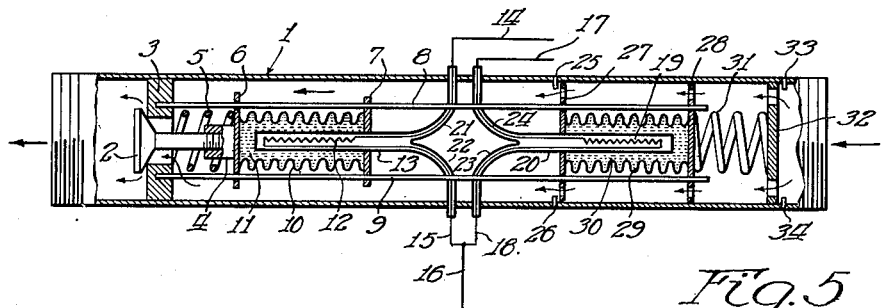
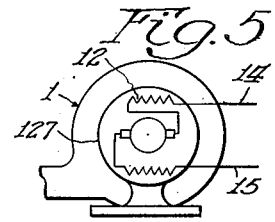
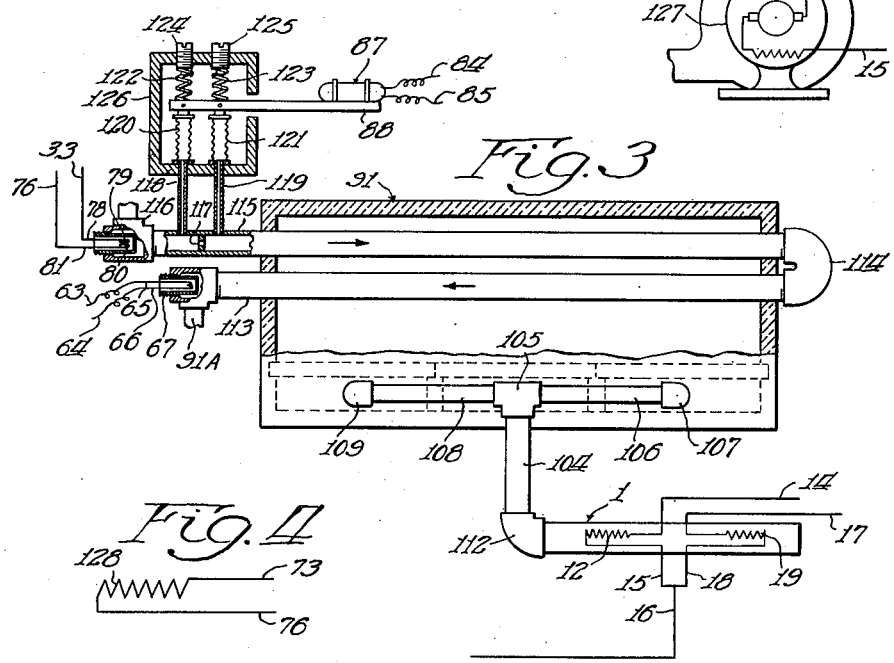
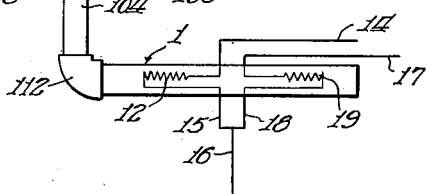
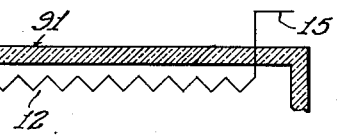
Inventor
Charles A. Martin
By Zabel & Banning
Atty.

April 14, 1936.   C. A. MARTIN   2,037,082
REGULATING SYSTEM
Filed Jan. 15, 1932   2 Sheets-Sheet 2

Inventor
Charles A. Martin
By Zabel & Banning
Atty.

Patented Apr. 14, 1936

2,037,082

UNITED STATES PATENT OFFICE 2,037,082

REGULATING SYSTEM

Charles A. Martin, Chicago, Ill., assignor to Herman S. Strauss, Chicago, Ill.

Application January 15, 1932, Serial No. 586,889

11 Claims. (Cl. 236—15)

My invention relates to a regulating, or control, system whereby a predetermined condition of control, such as pressure, or temperature, is maintained by the control responsive device operating in conjunction with other devices which may be entirely independent of the control responsive device.

More particularly the purpose of the invention is to regulate the flow of fuel to a heated zone not only in response to the temperature of said zone, but also in response to conditions eventually affecting the temperature of the heated zone, such as the quantity of material to be heated and its temperature before heating.

It is also a purpose of this invention to provide means for furnishing a temporary excess of fuel above normal for any of the actuating contacts which require closing to increase the fuel supply. Further provision is made for reducing temporarily the flow of fuel below normal for any of the actuating contacts which require closing to reduce the flow of fuel to the heated zone. A more constant regulation of the temperature of a heated zone is, therefore, obtainable in addition to a flow of fuel that is adjusted to a quantity closely approaching that required for any operating condition.

With the present methods of control, including the on-and-off, the graduated, or a modification of these, the actuating of the control valve is a function controlled entirely by the control instrument. The control instrument is usually influenced by the variation in the temperature to be controlled, but sometimes is also influenced by the rate of temperature change. To change the rate of flow of fuel through the control valve, a corresponding change in temperature of the measuring device is required. In many instances there is considerable time lag before the measuring device responds to a change in temperature due to the lag of its protecting case. There, also, may be appreciable lag before the temperature in the immediate vicinity of the measuring device responds to a change in the fuel in-put. Consequently, time is lost in both reducing and increasing the fuel in-put to maintain the desired control temperature. This factor is negligible if only small changes in fuel in-put are required to maintain the operating temperature. On the other hand, if large changes in fuel in-put are necessary, due to equivalent changes in the quantity of material to be heated, or changes in the initial temperature of the material to be heated, the lag mentioned is usually the cause of very unsatisfactory control.

The system described herein makes it possible to adapt the measuring system to making only slight changes in the fuel in-put in response to temperature changes, thus reducing the lag factor to negligible importance. Whatever supply of fuel is required to heat material within a heated zone is automatically shut off, when production of the material ceases, by a switch responsive to production. If the initial temperature of the material, or surrounding temperature, drops, another auxiliary switch responsive to temperature changes would automatically increase the flow of fuel affecting the heated zone. Under these conditions, it is only necessary for the control operated by the temperature responsive device to make slight changes in fuel in-put to compensate for variations in radiation of the heated zone and to compensate for any inaccuracies in the estimated quantities of fuel, controlled by the auxiliary switches, required to balance the heat absorption of the material to be heated. A fixed resistance compensates for the minimum radiation of the heated zone, for the particular operating temperature, or the control valve may be adjusted without the fixed resistance for this purpose.

In combination with any of the contacts for actuating the control valve, a time switch may be used. The function of this switch is to furnish a temporary increase in current, above normal for the actuating contact, to the control valve. In this way a greater change than normal is made in the fuel in-put to the heated zone. Consequently, any lag in the operation of the valve, or the response of temperature to a change in fuel in-put, is reduced to a minimum.

In this system, the relative quantities of fuel, controlled by the various switches is determined from the nature of the process. When using a heating system for heating articles to a high temperature, it is evident that the switch controlled by the rate of production would change the flow considerably. If the heating system is for heating a building, it is likewise evident that the temperature switch placed outside the building would change the flow appreciably, since the primary need of changing the flow of fuel is to offset a drop in the outside temperature.

With reference to the drawings:

Fig. 1 is a more or less diagrammatic view of the control valve for controlling the flow of fuel to the heating process.

Fig. 3 is a fragmentary diagrammatic view of a furnace for heating a fluid, including control switches operated from quantity of flow, and temperature of fluid before heating, in conjunction with control equipment responsive to the temperature of fluid after heating.

Fig. 4 shows a diagrammatic view of a modification of the auxiliary temperature switch wherein a resistance coil having an appreciable temperature coefficient of resistance is substituted for the switch.

Fig. 5 is a diagrammatic view of a proportional speed motor driven blower, or fuel mixer, which may be substituted for the valve mechanism of Fig. 1 to obtain certain features of the control described.

Fig. 6 is a fragmentary diagrammatical view of a furnace showing the source of heat to be electrical instead of from the combustion of fuel.

Figure 2:
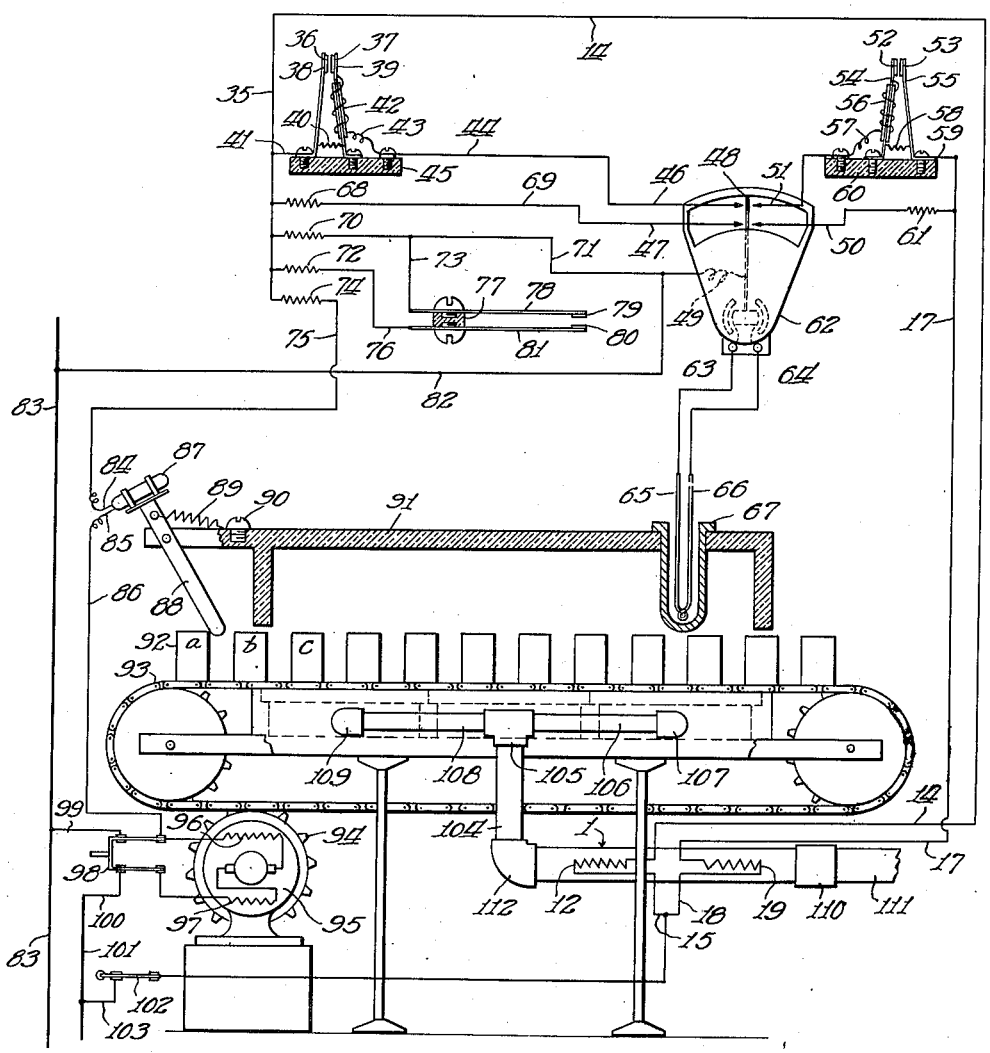
Fig. 2 is a diagrammatic view showing the complete assembly of control valve, continuous furnace, temperature measuring and control instrument, time switches, temperature switch, and switch operated in accordance with furnace production.

Referring more particularly to Fig. 1, I show a modified form of my valve described in Letters Patent 1,697,432 issued to me. Within the valve case 1 is the valve seat 3. Upon movement of the valve 2 off the seat 3, fuel is permitted to pass in a direction from right to left as indicated by direction arrows. The actuating elements of the valve 2 are the metal bellows 10 and 29 which are filled with an expanding fluid 11 and 30 respectively. Bellows 10 is sealed at one end with the cap 7 which in turn is fastened to the rods 8 and 9. The other end of bellows 10 is sealed with the cap 6 which is permitted to slide on the rods. An electric heating element 12, within the protecting tube 13, sealed to the cap 7, is connected to leads 14 and 15. When current is connected to these leads, the heat developed in the heater 12 causes the surrounding fluid to expand, resulting in an elongation of the bellows. The cap 6 being permitted to slide moves toward the valve seat. Attached to the cap 6 is the extension 4, into which the valve 2 is screwed. The elongation of the bellows 10, therefore, moves the valve in a direction to open it. This movement compresses the spring 5 which is ordinarily under pressure at all times, so that contraction of the bellows, due to cooling, is immediately followed by a closing movement of the valve.

The characteristics of bellows 29 are the same as bellows 10, except expansion of this bellows moves the valve toward a closed position, and contraction toward an open position. The fluid 30 is sealed within the bellows 29 at one end by the cap 27 and at the other end by the cap 28. Both caps are capable of sliding within the valve case 1; however, the cap 27 is held in a fixed position by pins 25 and 26 mounted in the case 1, due to the pressure exerted by the spring 31 supported by the bar 32 held within the case by pins 33 and 34. The rods 8 and 9 are fastened to cap 28 but are capable of sliding in the cap 27. Elongation of the bellows 29, therefore, moves the valve in a closed direction. Holes through bar 32 and caps 28 and 27 permit the flow of fuel. An electric heating element 19, within the case 20, sealed to the cap 27 is connected to leads 17 and 18. When current is connected to these leads, the heat developed in the coil 19 expands the fluid within the bellows to elongate it, to move the valve in the closed direction. The leads 14, 15, 17, and 18 are protected with suitable coverings, preferably lead cables 21, 22, 24, and 23, respectively. Leads 15 and 18 are connected to the common terminal 16.

With the valve construction as described, electric heating elements are used for both opening and closing the valve. By switching quickly from one element to another, the speed of action of the valve is materially increased, since the heating of one bellows and the cooling of the other one moves the valve in the same direction. Furthermore, a greater range of movement is obtainable than when only one bellows is heated. Having the heating element in each bellows makes it possible to take advantage of the time switch shown in Fig. 2 to quickly close the valve, as well as to quickly open it.

In Fig. 2, the control valve is shown connected in the fuel line between the coupling 110 which is connected to the supply line 111 and the elbow 112. Through the pipe connection 104, T 105, pipes 106 and 108, the fuel is supplied to burners connected to elbows 109 and 107 and T 105. Current passing through the coil 12 moves the valve in a direction to open it and current passing through the coil 19 moves the valve in a direction to close it, as previously described. Changes in the valve position change the supply of heat within the furnace-case 91, which is used to heat the articles 92A, B, C, and etc. These articles are conveyed through the furnace by the belt 93 driven by the sprocket 94 attached to the motor 95. The coils of the motor 96 and 97 are connected through the switch 98 and leads 99 and 100 to the power lines 101 and 83. One side of the power line 83 connects through the lead 82 to the lead 71 to the resistance 70. The other terminal of the resistance 70 connects through the lead 35 to the lead 14 of the heating element 12, thence through the lead 15 to the lead 16 connected to the switch 102. From the other terminal of the switch, it connects to the other power line 101 through the lead 103. The circuit to the heater 12 is complete, and sufficient fuel is supplied to the furnace to approximately balance the radiation loss. By increasing the resistance 70, less fuel is supplied to the furnace.

When the switch 98 is closed to operate the conveyor belt 93, and the article to be heated 92A tilts the arm 88 as shown to close the switch 87, the circuit from the power line 83 is completed through the leads 99 and 86, the switch terminals 85 and 84, and the lead 75, to one terminal of the resistance 74. As the other terminal of the resistance 74 is connected to the common terminal 35, the resistance 74 will be in parallel with the resistance 70. An increase in the current to the heater 12 is the result, with a corresponding increase in the flow of fuel to the furnace. If the articles are not placed on the conveyor belt, the spring 89, attached at one end to the screw 90 and at the other end to the arm 88, changes the position of the arm 88 so as to open the mercury switch 87 to decrease the flow of fuel to the furnace. Thus, if the articles are not put on the conveyor belt, the fuel in-put to the furnace is automatically decreased. On the other hand, if articles are put on the conveyor belt and it is shut down, the production switch circuit will be open anyway, as it is controlled by the same switch operating the drive for the conveyor belt. Consequently, the fuel in-put is decreased under either condition.

The temperature switch consists of the contact 79 attached to the strip of bimetallic thermostatic metal 78 and the contact 80 attached to the bimetallic thermostatic strip 81. Both strips are fastened to the insulating material 77, with the element having the greatest coefficient of expansion on the inside of each strip. A drop in temperature, therefore, moves the contacts 79 and 80 toward each other, and, when it is sufficient to close the contacts, the circuit is completed through the leads 73 and 76 which connects the resistance 72 in parallel with the resistance 70. This increases the current to the heating coil 12, resulting in an increase in flow of fuel through the valve. This switch is placed away from the furnace and is in no way influenced by the heat of the furnace. It may be placed where it will respond to the initial temperature of the articles to be heated, or, if the heating system is for heating a building, it would be preferable to place the switch outside to respond to atmospheric temperature. If desired, several of these switches can be used, and, by setting them to operate at different tmperatures, corresponding changes in the flow of fuel through the valve can be made. As described thus far, the means for changing the fuel in-put to the furnace are controlled by switches independent of the control instrument responsive to the furnace temperature.

For the actual control of temperature within the furnace wall 91, a thermocouple consisting of the dissimilar wires 65 and 66 is connected through the leads 63 and 64 to the instrument 62 operating the control pointer 48. This thermocouple is protected by the tube 67. With the position of the pointer 48 as shown, the correct temperature would be maintained within the furnace. A drop in temperature causes the control pointer 48 to move to the left while a rise in temperature causes it to move to the right. When the temperature drops, the pointer 48 first comes in touch with the contact 46. As the pointer is connected to one side of the resistance coil 70 through the leads 49 and 71, the circuit would be completed through the lead 44, the low resistance 43 of the time switch, the thermostatic strip 39, the contacts 37 and 36, the thermostatic strip 38 and through the lead 41 to the common terminal 35, connecting the low resistance 43 in parallel with the resistance 70. Due to the low resistance of the coil 43, nearly the full voltage is connected across the heater coil 12 of the valve, which quickly opens the valve to its maximum, or near maximum, position, depending on the set given the thermostatic strips 39 and 38 of the time switch. These strips are mounted on the insulating block 45, and are bimetallic metal with the element having the greatest coefficient of expansion on the inside of each strip so that a rise in temperature tends to separate the contacts 36 and 37. The watts dissipated by the coil 43 are sufficient to heat the thermostatic strips 38 and 39 enough to separate the contacts 36 and 37, in a period of time approximately equal to the time required for the thermocouple to respond to the increase in fuel in-put, or the time required to check the temperature drop. When the contacts 36 and 37 are open, the high resistance 40 is in series with the low resistance 43, which reduces the current to the heater 12 to normal for the particular control contact 46. The flow through the valve is correspondingly decreased so that the following rise in temperature will be slow to prevent overshooting. When the contacts 36 and 37 are open, the heat dissipated in the coils 43 and 40 keep them apart until the circuit is broken between the control pointer 48 and the contact 46, whereupon the contacts come together and are ready for another cycle. It will be noticed in the time switch that the coil 43 is insulated from the thermostatic strip 39 by the material 42. If the fuel adjustment made by the control pointer touching the contact 46 is not enough to restore the control to the correct position and the temperature continues to drop, the control pointer will touch the contact 47 in addition to contact 46. Through the lead 69, the resistance 68 would then also be connected in parallel with the resistance 70 to inrease the flow of fuel through the control valve.

A rise in temperature above the correct operating one deflects the control pointer 48 to the right, causing it to touch the contact 51. Since the pointer 48 is connected to one side of the line voltage 83, a current would pass through the contact 51, the low resistance coil 57, the thermostatic strip 54, contacts 52 and 53, thermostatic strip 55, lead 59, lead 17, through the heater 19 in the valve, the lead 18, and the lead 16 which connects through switch 102 and lead 103 to the other side of the power line. This current would be nearly the maximum one for the heater 19, as the resistance of coil 57 is very low. The control valve would then be operated in a direction to rapidly close it. However, depending on the lag existing between fuel shut off and the temperature response of measuring device, the pressure of the two contacts 52 and 53 against each other would be adjusted so that the contacts would open at about the same time as the temperature ceased to rise. The resistance 58 would then be in series with the coil 57 which reduces the current to the heater 19 of the valve, allowing the valve to then move toward an open position and finally attain a position where the flow of fuel through it would be close to the correct quantity to maintain the operating temperature. The coil 57 is insulated from the thermostatic strip 54 by the material 56. The heat developed by the coil 57 and the resistance 58 operates the contacts 52 and 53 in the same manner as the contacts 36 and 37 are operated.

If the rise in temperature above the operating one is excessive, the control pointer 48 will also touch the contact 50 which connects the resistance 61 in parallel with the resistance 57, or resistances 57 and 58 depending on the position of the contacts 52 and 53 of the time switch. This would keep the valve closed, or nearly closed, until the circuit was broken between the control pointer 48 and the contact 50.

In the illustration of the instrument 62, it would be necessary to use a very flexible pointer 48 to enable it to bend slightly and touch both low contacts 46 and 47, or both high contacts 51 and 50. The preferred way, however, would be to use the clamping mechanism which is well understood in the art of making control instruments.

In Fig. 3 the fragmentary diagrammatic view shows the application of the production switch 87 and the temperature switch having contacts 79 and 80, when a fluid is heated. The thermocouple consisting of the elements 65 and 66 and leads 63 and 64 connects to the temperature control instrument 62, as illustrated in Fig. 2. This couple is protected by the tube 67 which is installed in the chamber 91A and is responsive to the temperature of the heated fluid which comes out of the tube 113 into the chamber 91A. The unheated fluid enters the chamber 116, passes through the orifice 117, the tube 115, the elbow 114, and the tube 113. It is heated while passing through the tubes, as they are in contact with the heated zone within the furnace wall 91.

The temperature switch is mounted in the chamber 116 and responds to the incoming temperature of the fluid. It is adjusted so that the contacts close when the temperature falls below a desired degree. The fuel flow through the valve will, therefore, be increased in the manner as illustrated in Fig. 2, the same numerals being used for the corresponding parts.

The production switch 87 is operated by mechanism responsive to the rate of flow through the orifice 117 and the heating tubes. The pressure of the fluid on the inlet side of the orifice is applied to operate the bellows 120 through the connecting pipe 118, whereas the pressure of the fluid on the outlet side of the orifice is applied to operate the bellows 121 through the connecting pipe 119. When the spring pressure applied to bellows 120, by means of the spring 122 and the adjusting screw 124, equals the spring pressure applied to bellows 121 by means of the spring 123 and the adjusting screw 125, the switch arm 88 will be in the horizontal position with equal fluid pressures applied to each bellows. With fluid passing through the orifice, the fluid pressure applied to the bellows 120 will be greater than that applied to bellows 121, causing a greater elongation of the bellows 120 than that of the bellows 121. This will result in tilting the switch arm, causing the mercury to flow toward the contacts 84 and 85 and complete the circuit of these contacts to operate the control valve in the manner as described for this switch, the numerals corresponding to those of Fig. 2. By applying a greater spring pressure to the bellows 120 than that applied to the bellows 121, a correspondingly greater fluid pressure needs to be applied to the bellows 120 than to the bellows 121 in order to tilt the switch arm 88 and close the switch contacts. When the flow exceeds a predetermined quantity, the switch contacts operate the control valve to increase the flow of fuel to heat the fluid in the heating pipes. A decrease below the predetermined quantity would, of course, open the switch to reduce the fuel in-put to the furnace heating the fluid. The bellows, springs, and adjusting screws are supported by the frame 126. By placing several switches, such as illustrated by the switch 87, at different angles on the switch arm 88, several different rates of flow can be made to make changes in the fuel input to the furnace.

In Fig. 4, a coil 128 is shown. This coil is wound of a wire such as nickel having an appreciable temperature coefficient of resistance. As the temperature drops, the resistance of the coil drops. By substituting it for the temperature switch and connecting it to the respective leads 73 and 76 as shown by Fig. 2, the current to the control valve will be increased when the temperature of the coil drops, resulting in an increase in the flow of fuel to the heated zone.

In Fig. 5, a blower, or mixer, is shown housed within the case 1. This is operated by the proportional speed motor 127. The coil 12 and leads of the motor 14 and 15 can be substituted in place of the corresponding coil and leads of the valve shown in Fig. 2. An increase in current through the coil 12 increases the speed of the motor 127, to increase the flow of fuel to the heated zone.

In Fig. 6, the source of furnace heat is the electric winding 12. The leads 14 and 15 are substituted for the corresponding leads of the illustration shown by Fig. 2. An increase in the flow of current through the coil 12 results in a greater delivery of heat to the zone within the furnace wall 91. It is obvious that the production switch, or temperature switch, can be used for operating separate heating coils in a furnace, or control the electrical energy supplied to only one coil through suitable relays and switches.

Having described the various forms of my invention, what I claim is:

1. A system of the character described for treating a substance, comprising means for heating said substance, means responsive to a change in temperature of said substance while under treatment cooperating with means responsive to the quantity of said substance to be heated, means responsive to the temperature of said substance before heating, and means for controlling a temporary supply of heat above or below normal for heating said substance controllable by one of the aforesaid responsive means.

2. A system of the character described for treating a substance comprising means for changing the temperature of said substance, said means controlled by electric means, responsive to the temperature of said substance while under treatment, cooperating with electric means responsive to the input of said substance, electric means responsive to the surrounding temperature of said substance before heating, and electric means for supplying a temporary abnormal supply of heat to rapidly change the temperature of said substance controllable by one of said responsive means.

3. A system of the character described for treating a substance, comprising means for conveying said substance through a heated zone, means for heating said heated zone, means responsive to the temperature of said heated zone, electrical control means, comprising a plurality of contacts, responsive to said temperature means, electrically controlled thermally operated means associated with said contacts for first controlling a temporary change in the supply of heat to the heated zone, then the normal change in the supply of heat for the particular contact in operation, cooperating with an auxiliary switch responsive to the temperature outside said heated zone and an auxiliary switch responsive to the travel of the substance through heated zone, for automatically controlling the temperature of said heated zone.

4. A system of the character described for heating a substance, comprising a chamber heated by the combustion of fuel and an electrically operated control valve for controlling the flow of fuel for heating said chamber, said control valve comprising two metal bellows operated by the expansion and contraction of a fluid for controlling the position of said control valve, means for electrically heating said fluid for operating each bellows, means for circulating a medium for quickly cooling said fluids, said electrical heating means controllable by means responsive to the temperature of said heated chamber, cooperating with electric means responsive to the input of said substance, electric means responsive to the surrounding temperature of said substance before heating, and electric means for supplying a temporary abnormal supply of heat to rapidly change the temperature of said substance controllable by one of said responsive means, for controlling the magnitude of current to said electrical heating means for controlling the flow of fuel for heating said chamber.

5. A heating control system having a heating chamber, means for supplying heat to said chamber, a control device responsive to changes in temperature in said chamber, means for supplying material to be heated to said chamber, a control device responsive to the rate of input of said material, said heat supply means being responsive to the algebraic sum of the effects of said control devices to increase or decrease the heat supplied to said chamber.

6. A system of the character described for treating a substance, comprising means for heating said substance, means responsive to a change in temperature of said substance while under treatment cooperating with means responsive to the quantity of said substance to be heated, means responsive to the temperature of said substance before heating, and means for controlling a temporary supply of heat above or below normal for heating said substance controllable by aforesaid temperature responsive means.

7. A system of the character described for treating a substance comprising means for changing the temperature of said substance, said means controlled by electric means, responsive to the temperature of said substance while under treatment, cooperating with electric means responsive to the travel of said substance into said means for changing the temperature of said substance, electric means responsive to the surrounding temperature of said substance before heating, and electric means for supplying a temporary abnormal supply of heat to rapidly change the temperature of said substance controllable by said electric means responsive to the temperature of said substance while under treatment.

8. A heat control system comprising a heating chamber, means for supplying heat to said chamber, control means responsive to the effect of heat supply to said chamber for governing the supply of heat thereto, and auxiliary means cooperating with said control means and operating to first cause for a predetermined time a temporary abnormal increase in heat supply, then to cause a normal increase in heat supply when said control means responds to a failure of the heat supplied to maintain the predetermined effect desired.

9. A heat control system comprising a heating chamber, means for supplying heat to said chamber, control means responsive to the effect of heat supply to said chamber for governing the supply of heat thereto, and auxiliary means cooperating with said control means operating to first cause for a predetermined time a temporary abnormal decrease in heat supply, then to cause a normal decrease in heat supply when the heat supplied exceeds that required to maintain the predetermined effect desired.

10. A heat control system comprising a heating chamber, means for supplying heat to said chamber, control means responsive to the effect of heat supply to said chamber for governing the supply of heat thereto, and auxiliary means cooperating with said control means operating to first cause for a predetermined time a temporary abnormal decrease in heat supply, then to cause a normal decrease in heat supply when the heat supplied exceeds that required to maintain the predetermined effect desired, and auxiliary control means operative to first cause for a predetermined time a temporary abnormal increase in heat supply, then to cause a normal increase in heat supply when said control means responds to a failure of the heat supplied to maintain the predetermined effect desired.

11. A heat control system comprising a heating chamber, means for supplying heat to said chamber controllable by an electrical circuit in continuous contact, said electrical control circuit responsive to the effect of heat supply to said chamber for governing the supply of heat thereto in proportion to deviation from the predetermined control temperature and auxiliary means cooperating with said electrical control circuit to first cause for a predetermined time a temporary abnormal change and then to cause a normal change in fuel supply when said electrical control circuit responds to a change from the predetermined control temperature.

CHARLES A. MARTIN.